Patented July 18, 1933

1,919,005

UNITED STATES PATENT OFFICE

ULRIC B. BRAY, OF LOS ANGELES, CALIFORNIA, ASSIGNOR TO ATMOSPHERIC NITROGEN CORPORATION, OF NEW YORK, N. Y., A CORPORATION OF NEW YORK

PROCESS FOR THE OXIDATION OF AMMONIA AND CATALYST THEREFOR

No Drawing.   Application filed June 11, 1930.   Serial No. 460,544.

This invention relates to a process of oxidizing ammonia and to a contact material for catalyzing the oxidation reaction. More particularly, the invention relates to a process of oxidizing ammonia employing substantially pure cobalt oxide as a catalyst.

It has heretofore been proposed to employ cobalt oxide as a catalyst for the reaction between ammonia and oxygen to form nitrogen oxides. Cobalt oxide however as ordinarily prepared from commercial sources of cobalt, is not a satisfactory catalyst with respect to the high conversion efficiencies now required of commercial catalysts. It has been believed, therefore, that cobalt oxide alone was not a satisfactorily efficient catalyst for the oxidation of ammonia.

It is an object of this invention to provide a new cobalt oxide catalyst for the oxidation of ammonia substantially free from deleterious impurities and having a high catalytic activity. It is a further object of this invention to provide an efficient process for the oxidation of ammonia employing as a catalyst for the reaction a contact material comprising pure cobalt oxide free from deleterious impurities.

I have discovered that pure cobalt oxide is an active catalyst for the oxidation of ammonia, and that when cobalt oxide of a proper degree of purity is prepared, it efficiently catalyzes the reaction without the necessity of having present in the catalyst materials such as were heretofore considered promoters for cobalt oxide. I have further discovered that the presence of even relatively small amounts of certain impurities detrimentally affects the activity of the cobalt oxide. More particularly, I have discovered that nickel, silica, calcium, phosphorus, arsenic, antimony, silver and copper have an especially deleterious effect upon the activity of cobalt oxide, and that if excessive amounts of such substances are excluded as impurities from a cobalt oxide catalyst, such a catalyst is highly efficient. I have further discovered that pure cobalt oxide free from the above impurities not only is an active catalyst but that it retains its activity during relatively long periods of use without rapidly deteriorating.

The invention comprises, accordingly, the production of a cobalt oxide contact material substantially free from impurities detrimentally affecting the catalytic activity of the material. In its preferred embodiment the invention comprises a catalyst consisting of pure cobalt oxide free from nickel, silica, calcium, phosphorous, arsenic, antimony, silver and copper. The invention further comprises a process for the oxidation of ammonia employing the new catalyst described herein.

The following is a detailed description of methods for the production of ammonia oxidation catalysts in accordance with this invention:

*Example I.*—In manufacturing the catalyst material of this invention, cobalt metal may be dissolved in nitric acid to form a solution of cobalt nitrate. A cobalt metal of a high degree of purity should preferably be chosen, and in particular, a metal not containing excessive amounts of materials such as calcium compounds which will not be removed by the treatment with ammonia described below. The solution of cobalt nitrate may be prepared from the metal in accordance with the process described in the copending U. S. application Serial No. 361,414, filed May 8, 1929 by Eugene D. Crittenden. Ammonia is added to the solution of cobalt nitrate in amount sufficient to precipitate a portion only of the cobalt, for example, about 5% of the cobalt contained in the solution. This requires the addition of sufficient ammonia to neutralize any free acid in the solution, to react with any impurities which may be contained therein with which ammonia reacts and, in addition, the amount required for the precipitation of the desired proportion of the cobalt. The precipitate thus formed, which contains any iron, phosphorus and arsenic in the original cobalt nitrate solution, is separated from the solution, for example, by filtering. The solution of cobalt nitrate thus prepared is heated to drive out the water and then ignited at slowly increasing temperatures to decompose the nitrate and form cobalt oxide. A final temperature of about 400° C., is satisfactory. The cake of cobalt oxide, after being allowed to cool, is broken up into granules of a desired size.

The catalyst is now ready for use for the catalytic oxidation of ammonia to oxides of nitrogen. For example, the granular material is placed in a catalyst vessel where it is heated and a mixture of air containing about 9% ammonia passed in contact therewith at a temperature of about 800° C. The ammonia is oxidized to nitrogen oxides and the gas withdrawn from the catalyst treated in any desired manner for the recovery of the nitrogen oxides.

*Example II.*—A cobalt metal which does not contain undesirable amounts of impurities, such as nickel which are not removed by the fusion treatment described below, may be employed for the preparation of a catalyst as follows. The cobalt metal is charged into an electric furnace and heated to fuse a portion of it. After a small quantity of the metal has been melted a flux consisting of a mixture of limestone (calcium carbonate) and calcium fluoride is added in the proportions of about 3.5 to 5 parts of limestone and 1.7 to 3.5 parts of calcium fluoride for every 70 parts of metal. More metal may be added from time to time, together with additional flux as required. When the whole charge is molten a small amount of cobalt oxide is added to remove carbon dissolved from the electrodes and the slag is removed from the surface of the molten metal. The purified metal is then dropped into water to form cobalt shot. The described treatment of cobalt by fusion and a flux purifies it of materials such as silica, calcium and phosphorous impurities.

The thus purified cobalt metal is dissolved in nitric acid to form a solution of cobalt nitrate. After filtering off any undissolved residue the solution is evaporated to drive off the water and the cobalt nitrate heated at gradually increasing temperatures to decompose the nitrate and form cobalt oxide as is described above in Example I. The catalyst thus obtained is employed for the oxidation of ammonia by passing a mixture of air and ammonia containing about 9% ammonia in contact with the catalyst at a temperature of about 800° C.

*Example III.*—A high-grade of cobalt metal which contains sufficiently small amounts of impurities may be dissolved in nitric acid without preliminary purification and converted into an ammonia oxidation catalyst by evaporating the solution and igniting the cobalt nitrate in the manner described in Example I. Belgian electrolytic cobalt (purity 99.9%) is one example of cobalt metal which may thus be employed for the production of a satisfactory catalyst without preliminary purification.

In order to prepare an active catalyst in accordance with my invention, the cobalt oxide (calculated as $Co_2O_3$) to be employed as a catalyst should be of the following degrees of purity with respect to the noted impurities:

*Nickel (calculated as $Ni_2O_3$).*—Not more than about 0.75 parts and preferably not more than about 0.5 parts for every 100 parts of $Co_2O_3$.

*Calcium (calculated as $CaO$).* Less than about 0.2 parts and preferably not more than about 0.1 parts for every 100 parts of $Co_2O_3$.

*Silica (calculated as $SiO_2$).*—Not more than about 0.1 parts for every 100 parts of $Co_2O_3$.

*Phosphorus (calculated as $P_2O_5$).*—Less than 0.01 parts for every 100 parts of $Co_2O_3$.

*Arsenic (calculated as $As_2O_3$).*—Less than 0.01 parts for every 100 parts of $Co_2O_3$.

Since the effect of the impurities is additive, the total amount of all the impurities of the catalyst should be as low as possible. I have found that the presence of iron in an amount up to about 2% $Fe_2O_3$, while it has a slight deleterious influence upon the activity of the catalyst, does not excessively lower the efficiency of the cobalt oxide catalyst. Accordingly, although the presence of iron is not desirable, no great pains need be exercised to exclude relatively small amounts of iron impurities.

Since certain changes may be made in carrying out the above process for the oxidation of ammonia and in producing the catalyst of this invention without departing from the scope of the invention, it is intended that all matter contained in the above description shall be interpreted as illustrative and not in a limiting sense. It is not intended that the scope of the appended claims is to be limited to any particular method for preparing a cobalt catalyst nor to a particular process for oxidizing ammonia.

When in the specification and claims reference is made to the presence or absence of nickel, calcium, phosphorus, etc., it is not intended to imply that these materials are present as the elements. It is probable rather that they are present in the form of compounds and the words nickel, calcium, phosphorus, etc., are intended, therefore, to refer either to these materials as such or in combination with other material.

Catalysts may be prepared in accordance with my invention having a catalytic conversion efficiency as high as about 98%.

I claim:

1. The process of oxidizing ammonia which comprises contacting a gas containing ammonia and oxygen with substantially pure cobalt oxide.

2. The process of oxidizing ammonia which comprises contacting a gas containing ammonia and oxygen with a catalyst comprising cobalt oxide substantially free from phosphorous impurity.

3. The process of oxidizing ammonia which comprises contacting a gas containing ammonia and oxygen with a catalyst comprising cobalt oxide containing less than about 0.01 parts of phosphorus calculated as $P_2O_5$ to every 100 parts of cobalt calculated as $Co_2O_3$.

4. The process of oxidizing ammonia which comprises contacting a gas containing ammonia and oxygen with a catalyst consisting of cobalt oxide substantially free from impurities.

5. A catalyst for the oxidation of ammonia comprising cobalt oxide substantially free from impurities.

6. A catalyst for the oxidation of ammonia comprising cobalt oxide substantially free from phosphorous impurity.

7. A catalyst for the oxidation of ammonia comprising cobalt oxide containing not more than about 0.5 parts nickel calculated as $Ni_2O_3$ to every 100 parts of cobalt calculated as $Co_2O_3$.

8. The process of oxidizing ammonia which comprises contacting a gas containing ammonia and oxygen with a catalyst comprising cobalt oxide containing the following proportions of impurities in parts of impurity for every 100 parts of cobalt oxide calculated as $Co_2O_3$; not more than about 0.75 parts of nickel (calculated as $Ni_2O_3$), less than about 0.2 parts of calcium (calculated as CaO), not more than about 0.1 parts of silica (calculated as $SiO_2$), less than 0.1 parts of phosphorus (calculated as $P_2O_5$), and less than 0.01 parts of arsenic (calculated as $As_2O_3$).

9. The process of oxidizing ammonia which comprises contacting a gas containing ammonia and oxygen with a catalyst comprising cobalt oxide containing the following proportions of impurities in parts of impurity for every 100 parts of cobalt oxide calculated as $Co_2O_3$; not more than about 0.5 parts of nickel (calculated as $Ni_2O_3$), not more than about 0.1 parts of calcium (calculated as CaO), not more than about 0.1 parts of silica (calculated as $SiO_2$), less than 0.01 parts of phosphorus (calculated as $P_2O_5$), and less than 0.01 parts of arsenic (calculated as $As_2O_3$).

10. The process of oxidizing ammonia which comprises contacting a gas containing ammonia and oxygen with a catalyst comprising cobalt oxide containing not more than about 0.5 part nickel (calculated as $Ni_2O_3$) to every 100 parts of cobalt (calculated as $Co_2O_3$).

ULRIC B. BRAY.